Figure 5:
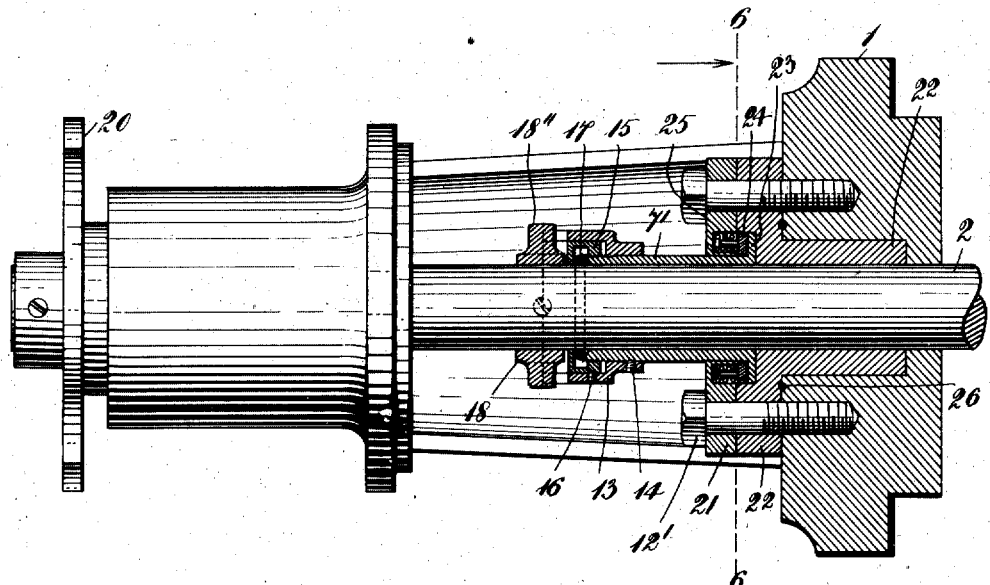

J. E. WILLCOX.
FLUID TIGHT JOINT FOR ROTARY VALVE STEMS.
APPLICATION FILED MAR. 9, 1911.
1,008,398.
Patented Nov. 14, 1911.
2 SHEETS—SHEET 1.
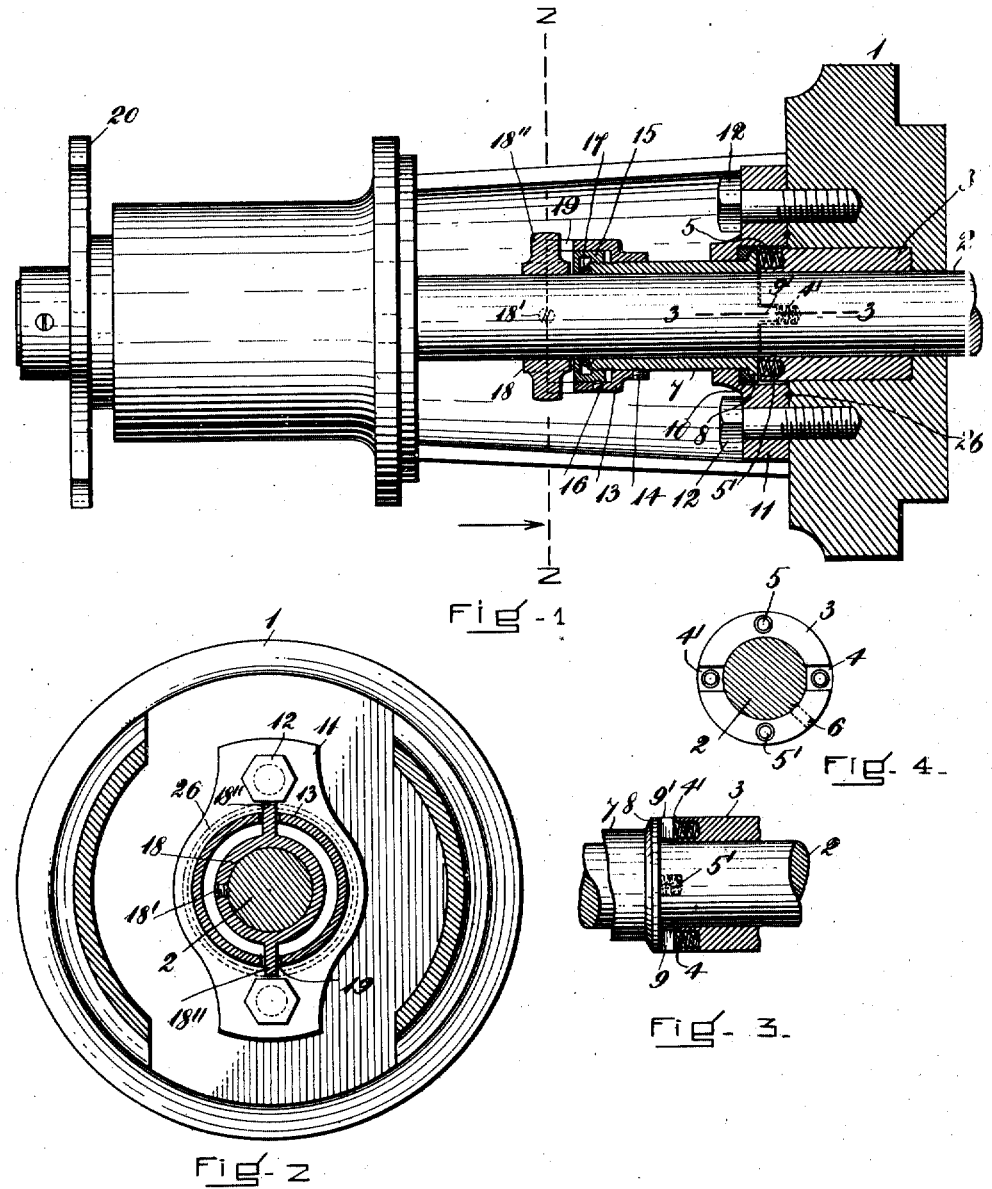

J. E. WILLCOX.
FLUID TIGHT JOINT FOR ROTARY VALVE STEMS.
APPLICATION FILED MAR. 9, 1911.

1,008,398.

Patented Nov. 14, 1911.

2 SHEETS—SHEET 2.

UNITED STATES PATENT OFFICE.

JAMES E. WILLCOX, OF MALDEN, MASSACHUSETTS, ASSIGNOR OF ONE-HALF TO CHARLES WEAR, OF MALDEN, MASSACHUSETTS.

FLUID-TIGHT JOINT FOR ROTARY VALVE-STEMS.

1,008,398.   Specification of Letters Patent.   Patented Nov. 14, 1911.

Application filed March 9, 1911. Serial No. 613,245.

*To all whom it may concern:*

Be it known that I, JAMES E. WILLCOX, a citizen of the United States, and a resident of Malden, in the county of Middlesex and State of Massachusetts, have invented a new and useful Improvement in Fluid-Tight Joints for Rotary Valve-Stems, of which the following is a specification.

My invention relates to fluid-tight joints for rotary valve stems, and its object is to provide a joint whereby the metallic or other packing heretofore employed may be eliminated.

Heretofore in steam or other fluid-tight joints for rotary valve rods, excessive pressure exerted on the packing has sometimes caused relative movement between the rod and the packing with the result that the rod became scarred and the packing injured and rendered ineffective. By means of the present invention I am enabled to overcome these defects.

In the drawings which accompany and form a part of this specification I have illustrated two embodiments of my invention as applied to rotary valve stems; but it will be understood that it is not limited to use therewith.

Figure 6:
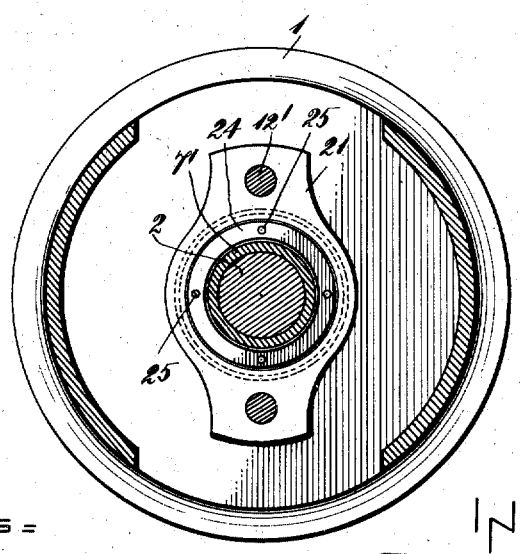

In the drawings, Figure 1 is a longitudinal vertical section of one embodiment of my invention. Fig. 2 is a transverse section taken on the line 2—2 of Fig. 1. Fig. 3 is a horizontal section taken on the line 3—3 of Fig. 1. Fig. 4 is a face view of the rear sleeve-driving device. Fig. 5 is a longitudinal vertical section of a modification. Fig. 6 is a transverse section taken on the line 6—6 of Fig. 5.

In the particular drawings selected for more fully disclosing my invention, 1 represents the bonnet of a rotary valve-stem in which the valve rod 2, provided with a tappet 20, is journaled for rotary motion. The forward face of the sleeve 3, located in a socket in the base of the bonnet, is provided with one or more slots 4 4' and one or more bores 5 5', in each of which a short spiral spring is located. By a set screw 6 or other suitable means, the sleeve 3 is secured to the valve rod.

7 is a sleeve surrounding the valve rod and provided at its rearward end with a flange 8 and with one or more lugs 9 9' which are arranged to coöperate with the slot or slots 4 4'. When the cover plate 11, which preferably incloses the projecting end of the sleeve 3, is secured to the base of the bonnet by the bolts 12, said lugs are forced into their corresponding slots, and the springs in said slots as well as the springs in the bore or bores 5 5' are suitably compressed, so that a steam-tight joint is effected between the flange 8 of the sleeve and the cover plate. Preferably the outer side of the flange 8 is rounded and a correspondingly shaped washer 10 is interposed between said flange and the cover plate to form a ball and socket joint.

A packing ring 17 of suitable material, such as soft metal or fiber, is placed around the shaft in front of the forward beveled end of the sleeve 7 and compressed against the same by the nut 15 threaded on the sleeve. A sleeve 13, provided with one or more end slots 19, is placed over the forward end of the sleeve 7 and secured thereto by the set screw 14 or by other suitable means. When the nut 15 has been sufficiently tightened, it is locked in position by the set screw 16, which is threaded into the sleeve 13. The winged collar 18 secured to the rod by the set screw 18', is so arranged that its wing or wings 18'' take into the slot or slots 19 of the sleeve 13.

As above stated, the pressure of the springs produces a steam-tight joint between the valve rod and cover plate, and the other joints are rendered steam-tight by the soft metal packing ring 26 compressed between the cover plate and the base of the bonnet, and the packing ring 17 compressed between the valve rod and the forward end of the sleeve.

The slotted sleeve 13 and winged collar 18 constitute the forward driving means for the sleeve 7, and the sleeve 3, which as above stated coöperates with the lugs 9 9', constitutes the rear driving means for said sleeve, so that under no circumstances can any relative rotational movement be created between the sleeve 7 and the valve rod. It will be understood of course that I do not limit myself to the use of both forward and rear drives and may employ only one.

In Fig. 5 I have shown a modification in which the forward drive only is employed. In this case the sleeve 7' is provided with a flange 23 which is rectangular in section and which takes against the front wall of the bushing 22 inserted in the base of the bonnet and held in position by the screws 12' which pass through the cover plate 21 and into the base of the bonnet. Interposed between the flange 23 and cover plate is a washer 24 provided with one or more pins 25, each of which is surrounded by a short spiral spring inclosed within a socket in said cover plate. When the parts are in position, the pressure exerted by the springs creates a steam-tight joint between the flange of the sleeve 7' and the bushing 22. Here again it will be seen that no relative rotational motion can be created between the sleeve and valve rod.

It will be obvious that the fluid-tight joint above described is not limited to use in steam apparatus, and that various modifications may be made by those skilled in the art in the particular devices illustrated without departing from the spirit of my invention.

I claim:

1. In a fluid-tight joint for rotary valve stems, a valve rod, a sleeve on said rod, means for making a fluid-tight joint between said rod and sleeve, driving means secured to said rod, a member secured to the forward end of said sleeve and coöperating with said driving means, other driving means secured to said rod, and means operatively connecting the rearward end of said sleeve with the last mentioned driving means.

2. In a fluid-tight joint for rotary valve stems, a valve rod, a sleeve on said rod, means for making a fluid-tight joint between said rod and the forward end of said sleeve, driving means secured to said rod, said driving means arranged to coöperate with the rearward end of said sleeve, and elastic means exerting pressure between said driving means and sleeve.

3. In a fluid-tight joint for rotary valve stems, a valve rod, a sleeve on said rod, means for making a fluid-tight joint between said rod and sleeve, a sleeve provided with notches secured to the forward end of said sleeve, and a winged collar secured to said rod and arranged to coöperate with said notches.

4. In a fluid-tight joint for rotary valve stems, a valve rod, a flanged sleeve thereon, a sleeve secured to said rod and having its forward face provided with slots, lugs on the rearward face of the flange of said flanged sleeve, said lugs arranged to coöperate with said slots, and a spring in each of said slots.

5. In a fluid-tight joint for rotary valve stems, a valve rod, a flanged sleeve thereon, a sleeve secured to said rod, a washer interposed between the forward face of the flange of said flanged sleeve and a stationary part of the joint, and means acting against the rearward face of said flange to exert pressure between the forward face of said flange and said washer and between said washer and said stationary part.

6. In a fluid-tight joint for rotary valve stems, a valve rod, a sleeve provided with a flange on said rod, driving means secured to said rod, a member secured to the forward end of said sleeve and coöperating with said driving means, a bushing located in a stationary part of said joint and carrying said rod, and means acting against the forward face of said flange for exerting pressure between the latter and said bushing.

7. In a fluid-tight joint for rotary valve stems, a valve rod, a sleeve provided with a flange on said rod, a bushing inserted in a stationary part of said joint and affording a bearing for said rod, a cover plate for said bushing, a plurality of sockets therein, a spring in each of said sockets, a washer interposed between said flange and cover plate, and a plurality of pins on said washer each projecting into one of said sockets.

8. In a fluid-tight joint for rotary valve stems, a valve rod, a sleeve surrounding said rod and provided with a rounded flange, a correspondingly rounded washer interposed between the rounded portion of said flange and a stationary part of the joint, and means acting against said flange to exert pressure between the same and said washer and between said washer and said stationary part for the purpose of effecting a steam-tight joint between said flange, washer, and stationary part.

In testimony whereof, I have hereunto subscribed my name this 8th day of March 1911.

JAMES E. WILLCOX.

Witnesses:
CHARLES WEAR,
GEO. K. WOODWORTH.